United States Patent [19]
Blackburn et al.

[11] Patent Number: 5,126,647
[45] Date of Patent: Jun. 30, 1992

[54] PULSE BY PULSE CURRENT LIMIT AND PHASE CURRENT MONITOR FOR A PULSE WIDTH MODULATED INVERTER

[75] Inventors: Scott E. Blackburn, Dearborn Heights, Mich.; Alexander Cook, Rockford, Ill.

[73] Assignee: Sundstrand Corporation, Rockford, Ill.

[21] Appl. No.: 509,740

[22] Filed: Apr. 17, 1990

[51] Int. Cl.⁵ .................................. H02P 5/17
[52] U.S. Cl. ............................. 318/599; 318/432
[58] Field of Search ........... 318/599, 811, 819, 430, 318/432, 433; 363/26, 41, 98; 388/804, 811, 819, 829, 831

[56] References Cited

U.S. PATENT DOCUMENTS

| | | | |
|---|---|---|---|
| 4,001,660 | 1/1977 | Lipo | 318/227 |
| 4,041,361 | 8/1977 | Cornell | 318/432 X |
| 4,290,001 | 9/1981 | Espelage | 318/811 |
| 4,433,276 | 2/1984 | Nola | 318/729 |
| 4,527,214 | 7/1985 | Hattori et al. | 361/96 |
| 4,574,340 | 3/1986 | Baker | 363/41 |
| 4,575,667 | 3/1986 | Kurakake | 318/803 |
| 4,581,569 | 4/1986 | Fujioka et al. | 318/811 |
| 4,599,549 | 7/1986 | Mutoh et al. | 318/798 |
| 4,608,527 | 8/1986 | Glennon et al. | 318/685 |
| 4,656,402 | 4/1987 | Nishikawa | 318/341 |
| 4,656,570 | 4/1987 | Swoboda | 363/26 |
| 4,692,854 | 9/1987 | Baxter, Jr. et al. | 363/75 |
| 4,719,400 | 1/1988 | Kurakake et al. | 318/811 |
| 4,745,991 | 5/1988 | Tanahashi | 318/801 X |
| 4,767,976 | 8/1988 | Mutoh et al. | 318/808 |
| 4,804,895 | 2/1989 | Miskin | 318/345 A |
| 4,812,724 | 3/1989 | Langer et al. | 318/599 |
| 4,827,391 | 5/1989 | Sills | 363/41 |
| 4,891,764 | 1/1990 | McIntosh | 318/432 X |
| 4,926,104 | 5/1990 | King et al. | 318/599 |
| 4,978,894 | 12/1990 | Takahara | 318/768 |

Primary Examiner—Bentsu Ro
Attorney, Agent, or Firm—Antonelli, Terry, Stout & Kraus

[57] ABSTRACT

An average current measuring circuit (40) in accordance with the invention includes a first switch (42) connected between a pair of reference potentials which has a duty cycle which is controlled by a control signal which pulse width modulates current flowing through the switch to a load and varies the current flowing through the switch in frequency; a first current transformer (44) coupled to the current flowing through the first switch for producing an output signal proportional to the current flow; a sampling circuit (46), coupled to the output signal, for sampling current magnitude when the switch is turned on; and an averaging circuit (60) coupled to the sampling circuit, for producing an average signal of successive samples of a current flow through the load.

28 Claims, 4 Drawing Sheets 5,126,647

PULSE BY PULSE CURRENT LIMIT AND PHASE CURRENT MONITOR FOR A PULSE WIDTH MODULATED INVERTER

TECHNICAL FIELD

The present invention relates to a system for measuring average current contained in pulses produced by an inverter producing a fundamental frequency from DC up to a predetermined frequency. More particularly, the present invention relates to a system of the foregoing type used for accelerating a motor from stop up to a predetermined velocity.

BACKGROUND ART

FIG. 1 illustrates a block diagram of a prior art motor control circuit which utilizes pulse width modulation of the "on" cycle of an inverter to control the rotational velocity of a motor. A motor 10 is driven at a synchronous speed by pulses produced by an inverter 12 which have the width of the individual pulses controlled by a pulse width modulation duty cycle controller 14. The pulse width modulation duty cycle controller 14 controls the variable fundamental frequency which is produced by the inverter 12. The inverter 12 outputs a fundamental frequency which is defined by an envelope comprised of a pulse width modulated carrier signal having a frequency between 6 and 12 KHz. The pulse width modulation of the "on" interval of the individual pulses outputted by the inverter 12 results in a fundamental output signal having a desired frequency range which may be used to accelerate the motor from stop up to a predetermined velocity. The motor 10, inverter 12 and pulse width modulation duty cycle controller 14 are conventional. A resolver 16 produces an output signal which indicates the position of the rotor of the motor with respect to a reference position. The point at which the switches within the inverter are turned on with respect to a time reference to produce pulse width modulation, controls advancing or retarding of the turning on point of the inverter switches to provide control of the rotation of the rotor in accordance with a predetermined control sequence. A current feedback circuit 18 produces a signal proportional to the current flow from the switches in the inverter 12 to the motor 10. The current feedback circuit 18 was implemented by Hall sensors. The disadvantage of using Hall sensors is that inexpensive Hall sensors are prone to drift which produces a variable gain and more complex expensive Hall sensors have reliability problems. The output of the current feedback circuit 18 which is proportional to the magnitude of current flow to the motor 10 from the inverter 12 is provided as an input to a difference circuit which outputs an error signal proportional to the difference between the output signal from the current feedback circuit and a current reference produced by current reference 22. The error signal outputted by the difference circuit 20 is integrated by integrator 24 which permits the error signal to be driven to zero. A summing circuit 26 sums the output signal produced by resolver 16 and the integrator 24 to produce a resultant signal which controls the advancing or retarding of the turning on point of the switches within the inverter in a manner inversely proportional to the magnitude of the output signal produced by the summing circuit. In other words, if the integrated error signal outputted by the integrator 24 is increasing, the turning "on" points of the switches within the inverter 12 are advanced and if the integrated output error signal is decreasing, the turning "on" points of the switches within the inverter are retarded.

Additionally, current transformers have been used to sense the fundamental frequency of current driving a motor. However, the usage of current transformers to sense the frequency of current in a motor which is being started from a stop condition is unreliable for the reason that when a synchronous acceleration is used, the frequency of the drive current at the time of starting the motor from a stop condition is so low that the operation of the current transformers does not produce a signal proportional to the magnitude of the current flow. Furthermore, current transformers have been used to sense the magnitude of current flowing in an inverter which is being pulse width modulated for the purpose of shutting down the inverter when the current flow exceeds a maximum permissible current.

DISCLOSURE OF INVENTION

The present invention is an average current measuring system and a current limiting system for use in a pulse width modulated inverter which provides an output fundamental frequency varying from zero to a predetermined frequency using a carrier frequency which is pulse width modulated. The invention provides a current limit for each pulse outputted by a switch within the inverter and further an average of the current flowing in each pulse over the entire fundamental frequency range of the inverter for controlling the advance or retarding of the pulses generated by the inverter for control purposes. The invention utilizes current transformers to sense the current flow in each pulse produced by the inverter to produce signals which are processed to determine if the current flow in each pulse exceeds a predetermined current limit and further to generate a signal proportional to the average current flow within the pulse by sampling the magnitude of the current near the beginning of the pulse and at the end of the pulse and averaging the two samples together to produce an average current signal. Using the current transformer to sense the magnitude of current of the pulses which are at the carrier frequency permits a current transformer to be used even when the fundamental frequency is at extremely low frequencies, such as, when the inverter is accelerating a motor from a stop which could not be accomplished with the prior art usage of current transformers in which the fundamental frequency was sensed which was too low to produce a signal proportional to the current flow.

An inverter in accordance with the present invention includes first and second switches having a conductivity switched between on and off states with a controlled duty cycle to produce current pulses defining a fundamental frequency varying from zero up to a predetermined frequency; first and second current transformers which respectively sense current flow from the first and second switches; and an averaging circuit coupled to the current transformers for producing a signal which is a function of an average current flow within the current pulses. The inverter is coupled to an electrical motor for controlling acceleration of the electrical motor from a stop to a predetermined speed by varying the fundamental frequency from zero to the predetermined frequency. The inverter further includes a controller for controlling the conductivity of the first and second switches to control producing the variable fundamental frequency; and circuitry, responsive to the signal which is a function of the average current flow within the current pulses, for varying a time interval during which the first and second switches are switched on as a function of the difference between the signal which is a function of the average current flow and a current reference. The invention further includes a resolver, associated with the motor, which produces a signal representative of a position of a rotor of the motor; and wherein the circuitry for varying comprises an integrator for integrating a signal proportional to a difference between the signal which is a function of the average current and a current reference to produce an integrated output signal and a summer for summing the signal representative of the position of the rotor and the integrated output signal to produce a signal for controlling a time which the first and second switches are switched on.

An average current measuring system in accordance with the invention includes a first switch connected between a pair of reference potentials which has a duty cycle which is controlled by a control signal which pulse width modulates a current flowing through the switch to a load and varies the current flowing through the load in frequency; a first current transformer coupled to current flowing through the first switch for producing an output signal proportional to the current flow; a first sampling circuit coupled to the output signal, for sampling current magnitude when the switch is switched on; and an averaging circuit, coupled to the first sampling circuit, for producing an average signal of successive samples of a current flow through the load. The first sampling circuit comprises first and second sample circuits each having an input coupled to the output signal from the current transformer and an output which holds a sampled magnitude of the output signal from the current transformer in response to an applied sample signal, the first sample circuit sampling current magnitude during a beginning portion of current flow through the first switch and the second sample circuit sampling current magnitude during an ending portion of current through the first switch; and a first adding circuit for combining the outputs from the first and second sample circuits into a first average signal. The invention further includes a first bistable circuit having an input coupled to the control signal for pulse width modulating current flow in the first switch, a reset input coupled to an inversion of the control signal and first and second output signals which change level in response to a change in level of the control signal for pulse width modulating, the second output signal being an inversion of the first output signal, the first output signal being the sample signal from the first sample circuit and the second output signal being the sample signal from the second sample circuit. The invention further includes a first one-shot multivibrator having an input coupled to the control signal for pulse width modulating and producing an output signal having an astable state in response to an input signal of a first level, the output signal being coupled to a clock input of the bistable circuit; and wherein the control signal for pulse width modulating is coupled to a data input of the first bistable circuit. A first current limiter is coupled to a reference current limit signal proportional to a maximum magnitude of current which is permitted to flow through the first switch and the output signal for the first current transformer for producing a current limit control signal when a magnitude of current flow through the first switch exceeds the current limit which causes the first switch to turn off.

The invention further includes a second switch connected between a pair of reference potentials which has a duty cycle which is controlled by a control signal which pulse width modulates a current flowing through the second switch to the load and varies the current flowing through the switch in frequency, the control signals causing current flowing to the load to vary from DC up to a predetermined AC frequency; a second current transformer coupled to the current flowing through the second switch for producing an output signal proportional to the current flow; a second sampling circuit coupled to the output signal of the second current transformer for sampling current magnitude when the second switch is turned on; and wherein the averaging circuit is also coupled to the second sampling circuit and produces an average signal of successive samples of current flow through the load from the first and second switches. The second sampling circuit further comprises third and fourth sample circuits each having an input coupled to the output signal from the second current transformer and an output which holds a sampled magnitude of the output signal from the second current transformer in response to an applied sample signal, the third sample circuit sampling current magnitude during a beginning portion of current flow through the second switch and the fourth sample circuit sampling current magnitude during an ending portion of the current flow through the second switch; a second adding circuit for combining and inverting the outputs of the third and fourth sample circuits into a second average signal and an adding circuit for adding the first and second average signals together to produce a signal proportional to the average current flow through the load. The invention further includes a second bistable circuit having an input coupled to the control signal for pulse width modulating current flow in the second switch, a reset input coupled to an inversion of the control signal and first and second output signals which change level in response to a change in level of the control signal for pulse width modulating the second switch, the second output signal being an inversion of the first output signal, the first output signal being the sample signal from the third sample circuit and the second output signal being the sample signal from the fourth sample circuit. The invention further includes a second one-shot multivibrator having an input coupled to the control signal for pulse width modulating and producing an output signal having an astable state in response to an input signal of a first level, the output signal being coupled to a clock input of the second bistable circuit and wherein the control signal for pulse width modulating the second switch is coupled to a data input of the first bistable circuit. A second current limiter is coupled to a reference current limit signal proportional to a maximum magnitude of current which is permitted to flow through the second switch and to the output signal from the second current transformer for producing a current limit control signal when a magnitude of current flow through the second switch exceeds the current limit which causes the second switch to turn off.

The invention further includes a controller for controlling the conductivity of the first and second switches to control producing a variable frequency fundamental frequency varying from zero to a predetermined frequency and circuitry, responsive to the average signal produced by the average circuit and coupled to the first and second switches for varying a time interval during which the first and second switches are turned on as a function of a difference between the average signal and a current reference. The load is an electrical motor having a resolver which produces a signal representative of a position of the rotor of the motor; and the circuitry for varying comprises an integrator for integrating a signal proportional to the difference between the average signal and the current reference to produce an integrated output signal and a summer for summing the signal representative of the position of the rotor and the integrated output signal to produce a signal for controlling a time during which the first and second switches are turned on.

BEST MODE FOR CARRYING OUT THE INVENTION

Figure 1:
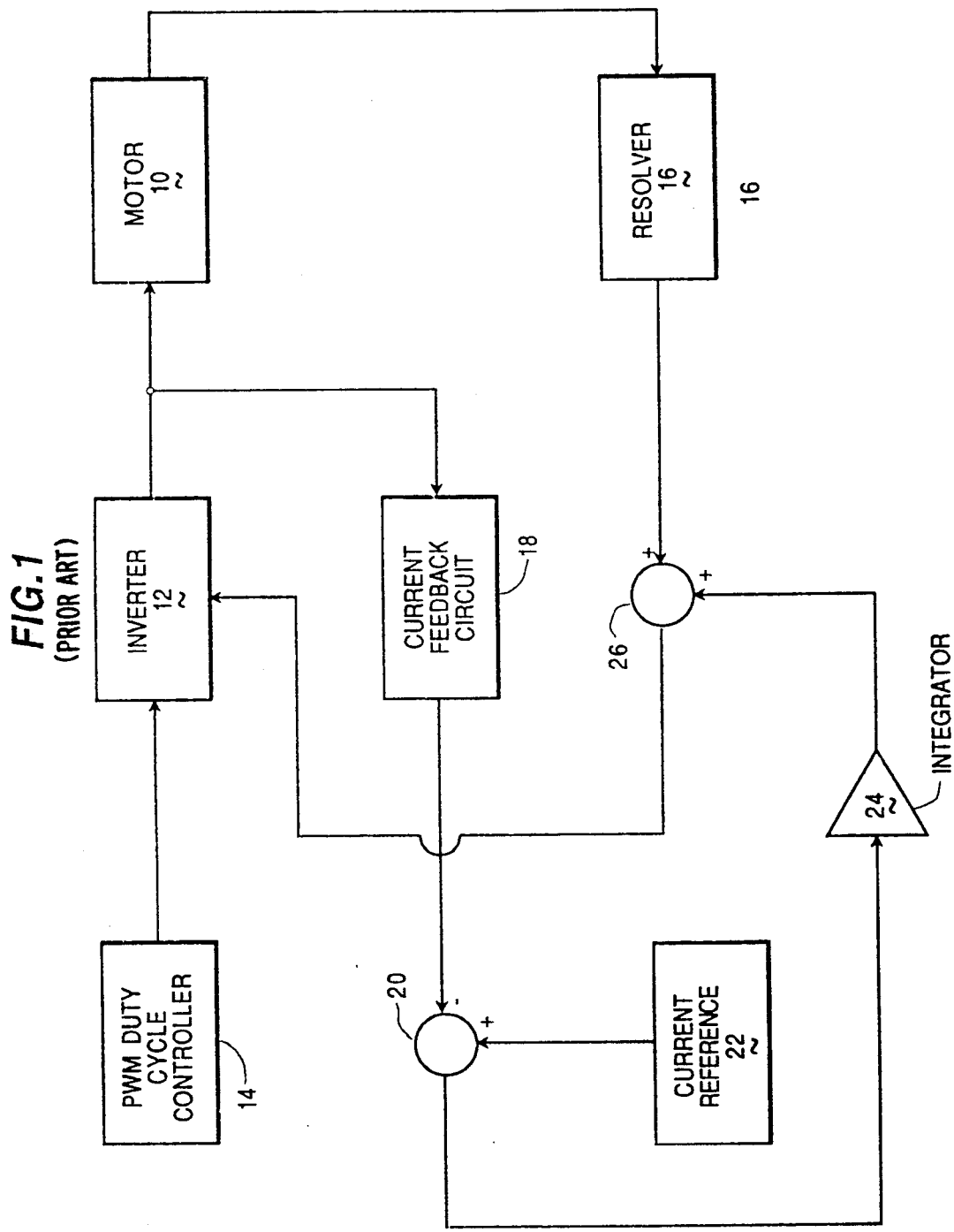
FIG. 1 illustrates a block diagram of a prior art motor control system.
Figure 2:
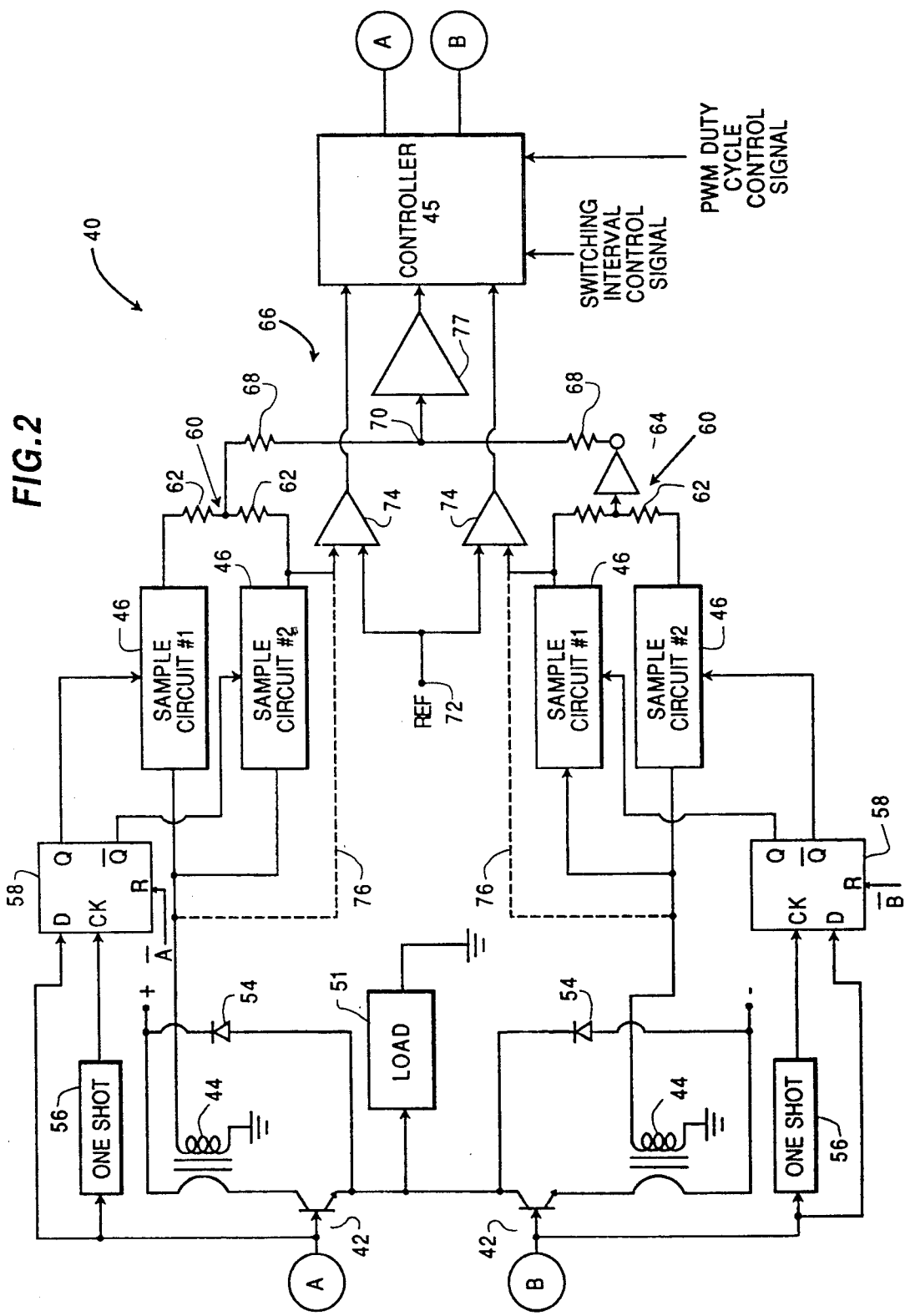
FIG. 2 illustrates a block diagram of a pulse by pulse current averaging and current limiting circuit in accordance with the present invention.

FIG. 2 illustrates a pulse by pulse current averaging and current limiting circuit which may be used to determine the average flow of current in pulses produced by an inverter in driving a reactive load and further for limiting the magnitude of the current to a maximum predetermined level. The circuit 40 may be used in the system of FIG. 1 in place of the Hall detectors utilized in the current feedback circuit 18. When pulses are used to drive a inductive load from a source such as an inverter, the current lags the voltage which causes the current of the pulses to increase or decrease over the duration of the pulses. As a result, a determination of the magnitude of current present during pulses produced by an inverter may not be determined simply by sampling the magnitude of the current present at a single point in time within the pulses. With the invention, a current transformer 44 is coupled to the output of each pulse source 42 which may be a power switch such as a pair of power switches found in an inverter for producing a signal proportional to the current flow. The current is sampled at a beginning and an end of each pulse with the resultant samples being added together to produce a signal proportional to the average current present in the pulses. When the pulses are pulse width modulated as in the prior art of FIG. 1 at a frequency high enough to define an envelope of the desired fundamental frequency, the current transformers 44 produce an output signal which is proportional to the actual flow of current to the load even when the fundamental frequency is at extremely low frequencies such as when a motor is accelerated from a stop. The rate of switching of pulses produced by a pulse width modulated inverter is sufficiently high that the output signal from a current transformer is proportional to the current flow to the load even when the fundamental frequency is at extremely low frequencies. In the prior art, the use of current transformers to sense the fundamental frequency flowing to the load, such as a motor being accelerated from stop, was not possible because of the characteristic of a current transformer not producing an output signal proportional to the magnitude of current flow when the fundamental frequency which is coupled to the current transformer is extremely low, such as when accelerating motors from a stopped condition.

The present invention may be used for control purposes in electrical loads being driven by an inverter in which the load is reactive in applications where the magnitude of current flowing to the load must be determined for accurate control.

The current averaging and current limiting circuit 40 of FIG. 2 contains a pair of power switches 42 contained in an inverter of standard design. The duty cycle of the power switches 42 is controlled by a PWM DUTY CYCLE CONTROL SIGNAL produced by a PWM duty cycle controller 14 such as that illustrated in FIG. 1. Additionally, the controller 45 is responsive to a SWITCHING INTERVAL CONTROL SIGNAL for advancing or retarding the time at which the switches 42 are turned on. A source of the signal for advancing or retarding the time during which the switches 42 are turned on may be produced by the summer 26 of the prior art of FIG. 1. The PWM DUTY CYCLE CONTROL SIGNAL controls the depth of modulation of the fundamental frequency produced by the inverter and the SWITCHING INTERVAL CONTROL SIGNAL controls the advancing or retarding of when the switches 42 are turned on with respect to the position signal outputted by a rotor position determiner such as the resolver 16 of FIG. 1. The primary of a current transformer 44 is connected in series with the output of each of the power switches 42 to produce an output signal from the secondary which is applied to a pair of sample circuits 46. The secondary of the top current transformer 44 is applied to first and second sample circuits 46 and the output from the secondary of the bottom current transformer is applied to first and second sample circuits 46. The output of the secondary of the top current transformer 44 is illustrated as the positive going pulses in FIG. 3 and the output of the inverter 64 is illustrated as the negative going pulses in FIG. 3. A pair of conventional freewheeling diodes 54 are coupled across the power terminals of the transistors 42.

Figure 3:
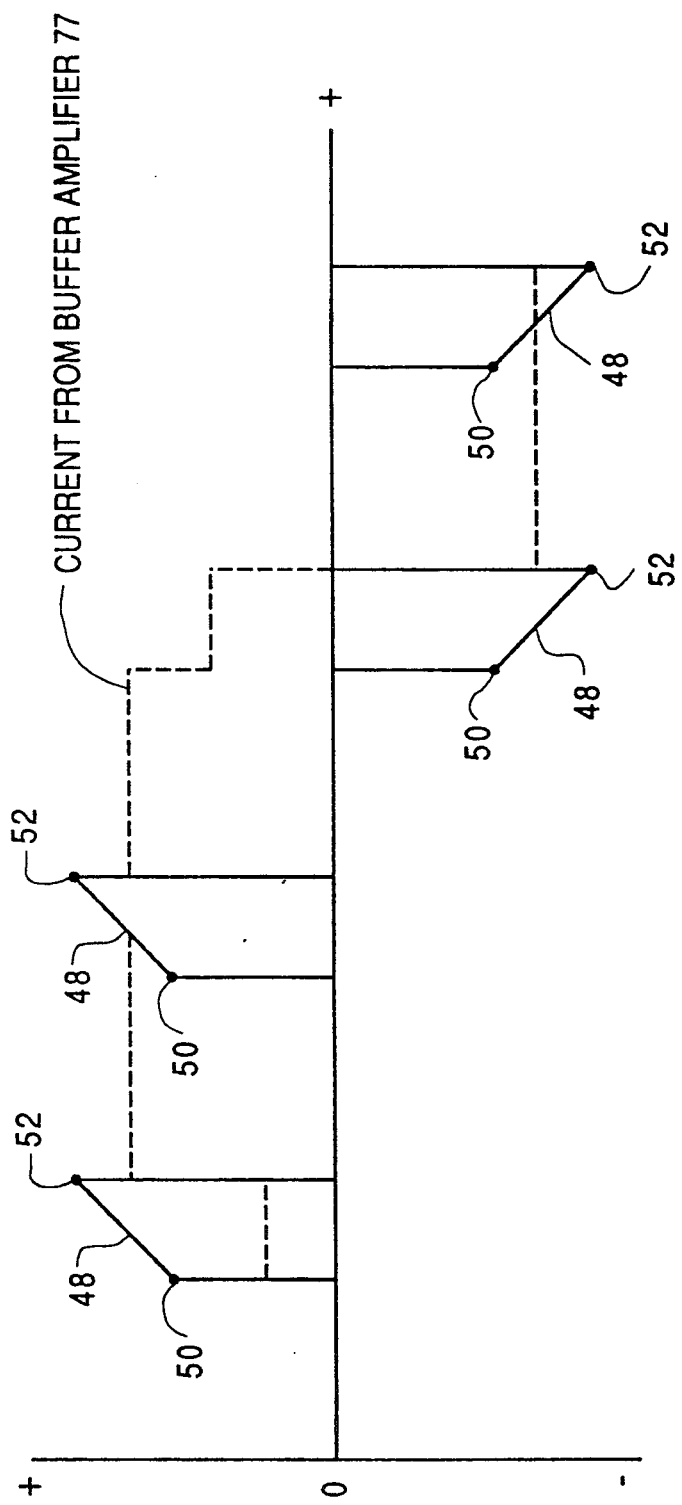
FIG. 3 illustrates an oscillogram of the samples of pulses outputted by the sample circuits of FIG. 2.

With reference to FIG. 3, the slope of current increasing in magnitude which occurs from the beginning of the pulse to the end of the pulse is caused by the reactive nature of the load 51 which is being driven by the power switches 42 of the inverter. It is assumed that the slope between sample points 50 and 52 which is produced by the sample circuits 46 as described below is linear for purposes of the control circuit of the present invention.

The combination of a one-shot multivibrator 56 and bistable circuit 58, which may be a conventional D-type flip-flop, is used to control the sampling of the output of the secondary of the current transformers 44. The output signals produced by the flip-flop 58 Q and $\overline{Q}$ respectively are applied to the first and second sample circuits which determine the time at which the magnitude of the current flow through the power switches 42 is sampled. The one-shot multivibrator 56 is provided to delay the time at which the sample point 50 is taken with respect to the beginning of the pulse produced by the power switches 42 to permit signal perturbations to die out as a consequence of reactive components present in the load. As a result of the one-shot multivibrator 56 coupled to the clock input of each of the flip-flops 58, the sample point 50 in FIG. 3 is delayed a short interval of time to permit the aforementioned signal perturbations (not illustrated) to reach a steady state. The reset input of each of the flip-flops 58 which is an inversion of the signal which causes the power transistors 42 to turn on causes the outputs Q and $\overline{Q}$ to change level to cause the second sample circuit 46 to sample the level of the current pulse at point 52 in FIG. 3. The sample circuits function to latch the respective current values. The output of the sample circuits is averaged in an averaging circuit 60 which is comprised of a pair of resistances 62 coupled to the respective outputs of the first and second sample circuits 46. An inverter 64 inverts the average of the output signals of the lower first and second sample circuits 46 to produce a bipolar output at point 70 representative of current flow as illustrated in FIG. 3.

The circuit 40 further functions to provide a current limit for the controller 45. The current reference 72, which is a maximum level of current which is permissible to be outputted by each of the power switches 42, is applied to a pair of comparators 74 which also receive an input either directly from the secondary of the current transformers 44 or from one of the sample circuits 46. In the event that current limitation is to occur during an initial turn on current surge, the connection 76 to the comparator 74 is used. In the event that current limitation is to occur after the initial turn on current surge, the connection from the output of the sample circuits 46 is used. When the output of the top comparator 74 goes high, the top power switch 42 is turned off immediately to limit the current and when the output of the bottom comparator 74 goes high, the bottom power switch 42 is turned off immediately to limit the current for the purpose of avoiding possible damage to the switches or to the load such as under conditions of a short circuit or failure in the load. Buffer amplifier 77 scales the current average outputted at point 70 by a suitable scaling factor for control purposes. The dotted line in FIG. 3 illustrates the current level at the output of buffer amplifier 77.

It should be understood that the circuit 40 of FIG. 2 illustrates only a single phase inverter. The present invention may be practiced with multiple phases in which additional pairs of power switches 42 are provided for driving a multiple phase electrical load 51 such as a three phase electrical motor. The additional phases have not been illustrated for purposes of simplifying the illustration of the invention.

Figure 4:
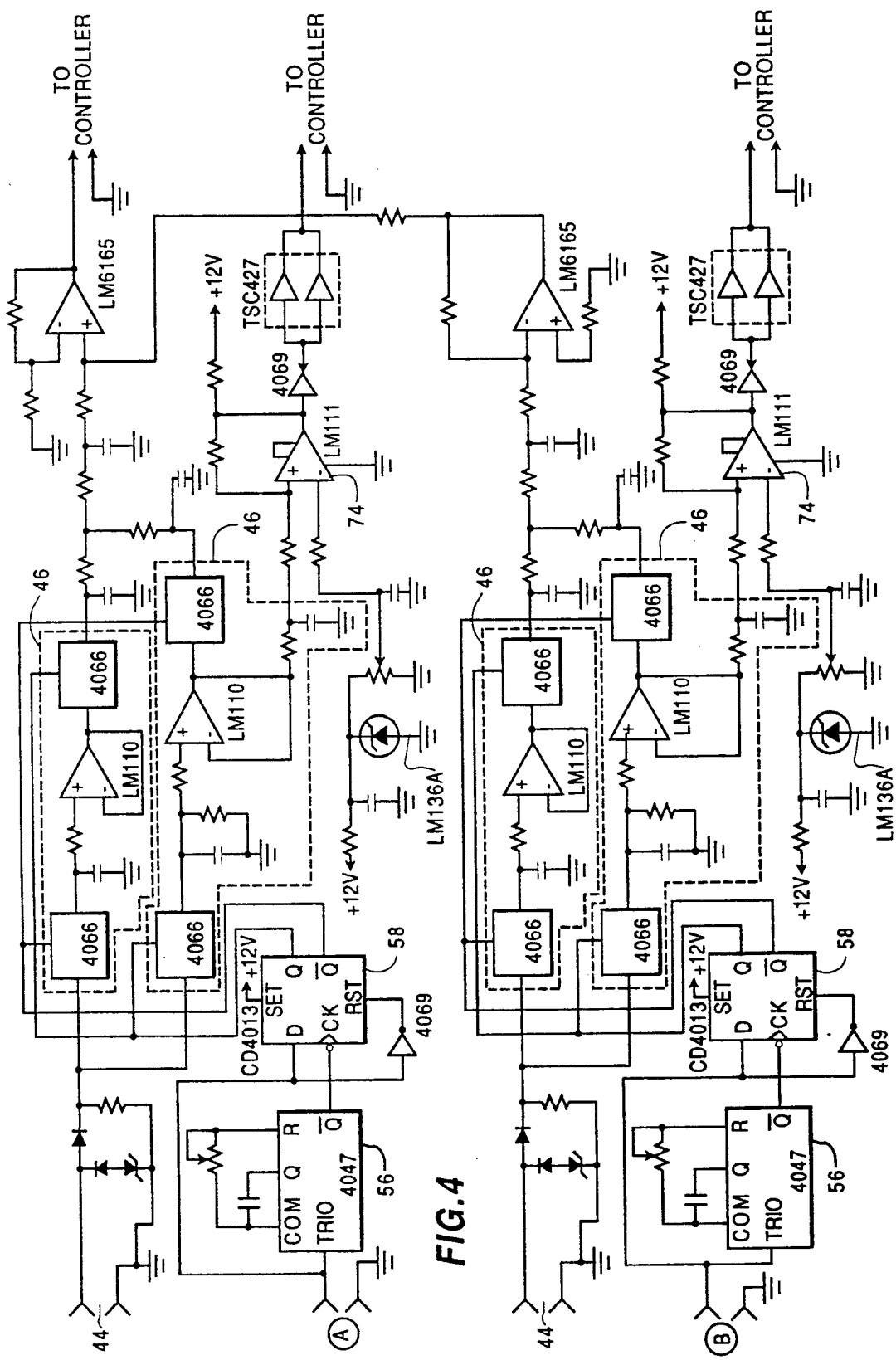
FIG. 4 illustrates a circuit schematic of an implementation of the circuit of FIG. 2.

FIG. 4 illustrates a circuit for implementing the block diagram of FIG. 2. Like parts are identified by like reference numerals in FIGS. 2 and 4. Integrated circuits are identified by their industry or manufacturer's designation.

While the invention has been described in terms of its preferred embodiment, it should be understood that numerous modifications may be made thereto without departing from the spirit and scope of the invention as defined in the appended claims. It is intended that all such modifications fall within the scope of the appended claims.

We claim:

1. An average current measuring circuit comprising:
    a first switch connected between a pair of reference potentials which has a duty cycle which is controlled by a control signal which pulse width modulates current flowing through the switch to a load to produce a series of current pulses and varies the current flowing through the switch in frequency;
    a first current transformer coupled to the current flowing through the first switch for producing an output signal proportional to the current flow in individual current pulses;
    a first sampling circuit, coupled to receive the output signal of the first current transformer, for sampling current magnitude at a beginning and at an end of each current pulse when the switch is turned on; and
    an averaging circuit, coupled to the first sampling circuit, for producing an average signal of the sampled current magnitude at the beginning and ending of each current pulse within each current pulse of current flowing through the load.

2. An average current measuring circuit in accordance with claim 1 wherein the first sampling circuit comprises:
    first and second sample circuits each having an input coupled to receive the output signal from the first current transformer and an output which holds a sampled magnitude of the output signal from the first current transformer in response to an applied sample signal, the first sample circuit sampling the current magnitude during the beginning of current flow through the first switch in each current pulse and the second sample circuit sampling the current magnitude during the ending of current flow through the first switch in each current pulse; and
    a first adding circuit for combining the outputs from the first and second sample circuits into a first average signal of each current pulse.

3. An average current measuring circuit in accordance with claim 2 further comprising:
    a first bistable circuit having an input coupled to receive the control signal for pulse width modulating current flow in the first switch, a reset input coupled to receive an inversion of the control signal and first and second output signals which change level in response to a change in level of the control signal for pulse width modulating, the second output signal being an inversion of the first output signal, the first output signal being the sampled signal for the first sample circuit and the second output signal being the sample signal for the second sampled circuit.

4. An average current measuring circuit in accordance with claim 3 further comprising:
    a first one shot multivibrator having an input coupled to receive the control signal for pulse width modulating and producing an output signal having an astable state in response to an input signal of a first level, the output signal being coupled to a clock input of the first bistable circuit; and wherein
    the control signal for pulse width modulating is coupled to a data input of the first bistable circuit.

5. An average current measuring circuit in accordance with claim 1 further comprising:
    a first current limiter coupled to receive a reference current limit signal proportional to a maximum magnitude of current which is permitted to flow through the first switch and to receive the output signal from the first current transformer for producing a current limit control signal when the magnitude of current flow through the first switch exceeds the current limit signal which causes the first switch to turn off.

6. An average current measuring circuit in accordance with claim 2 further comprising:

a first current limiter coupled to receive a reference current limit signal proportional to a maximum magnitude of current which is permitted to flow through the first switch and to receive the output signal from the first current transformer for producing a current limit control signal when the magnitude of current flow through the first switch exceeds the current limit signal which causes the first switch to turn off.

7. An average current measuring circuit in accordance with claim 2 further comprising:
a first current limiter coupled to receive a reference current limit signal proportional to a maximum magnitude of current which is permitted to flow through the first switch and to receive the output from one of the sample circuits for producing a current limit control signal when the magnitude of current flow through the first switch exceeds the current limit signal which causes the first switch to turn off.

8. An average current measuring circuit in accordance with claim 3 further comprising:
a first current limiter coupled to receive a reference circuit limit signal proportional to a maximum magnitude of current which is permitted to flow through the first switch and to receive the output signal from the first current transformer for producing a current limit control signal when the magnitude of current flow through the first switch exceeds the current limit signal which causes the first switch to turn off.

9. An average current measuring circuit in accordance with claim 3 further comprising:
a first current limiter coupled to receive a reference current limit signal proportional to a maximum magnitude of current which is permitted to flow through the first switch and to receive the output from one of the sample circuits for producing a current limit control signal when the magnitude of current flow through the first switch exceeds the current limit signal which causes the first switch to turn off.

10. An average current measuring circuit in accordance with claim 4 further comprising:
a first current limiter coupled to receive a reference current limit signal proportional to a maximum magnitude of current which is permitted to flow through the first switch and to receive the output signal from the first current transformer for producing a current limit control signal when the magnitude of current flow through the first switch exceeds the current limit signal which causes the first switch to turn off.

11. An average current measuring circuit in accordance with claim 4 further comprising:
a first current limiter coupled to receive a reference current limit signal proportional to a maximum magnitude of current which is permitted to flow through the first switch and to receive the output from one of the sample circuits for producing a current limit control signal when the magnitude of current flow through the first switch exceeds the current limit signal which causes the first switch to turn off.

12. An average current measuring circuit in accordance with claim 1 wherein:
the load is an electrical motor for starting an airframe propulsion engine.

13. An average current measuring circuit in accordance with claim 2 wherein:
the load is an electrical motor for starting an airframe propulsion engine.

14. An average current measuring circuit in accordance with claim 3 wherein:
the load is an electrical motor for starting an airframe propulsion engine.

15. An average current measuring circuit in accordance with claim 4 wherein:
the load is an electrical motor for starting an airframe propulsion engine.

16. An average current measuring circuit in accordance with claim 5 wherein:
the load is an electrical motor for starting an airframe propulsion engine.

17. An average current measuring circuit in accordance with claim 1 further comprising:
a second switch connected between a pair of reference potentials which has a duty cycle which is controlled by a control signal which pulse width modulates a current flowing through the second switch to the load to produce a series of current pulses and varies the current flowing through the switch in frequency, the control signal causing current flowing to the load to vary from DC up to predetermined AC frequency;
a second current transformer coupled to the current flowing through the second switch for producing an output signal proportional to the current flow in individual current pulses;
a second sampling circuit, coupled to receive the output signal of the second current transformer, for sampling current magnitude at a beginning and end of each current pulse when the second switch is turned on; and wherein
the averaging circuit is also coupled to the second sampling circuit, and produces an average signal of the sampled current magnitude at the beginning and ending of each current pulse of current flowing through the load from the first and second switches.

18. An average current measuring circuit in accordance with claim 17 wherein the second sampling circuit further comprises:
third and fourth sample circuits each having an input coupled to receive the output signal form the second current transformer and an output which holds a sampled magnitude of the output signal from the second current transformer in response to an applied sample signal, the third sample circuit sampling the current magnitude during the beginning of current flow through the second switch in each current pulse and the fourth sample circuit sampling the current magnitude during the ending of current flow through the second switch in each current pulse;
a second adding circuit for combining and inverting the outputs of the third and fourth sample circuits into a second average signal of each current pulses sampled by the third and fourth sample circuits; and
a combining circuit for adding the first and second average signals together to produce a signal proportional to the average current flow through the load.

19. An average current measuring circuit in accordance with claim 18 further comprising:

a second bistable circuit having an input coupled to receive the control signal for pulse width modulating current flow in the second switch, a reset input coupled to receive an inversion of the control signal and first and second output signals which change level in response to a change in level of the control signal for pulse width modulating the second switch, the second output signal being an inversion of the first output signal, the first output signal being the sampled signal for the third sample circuit and the second output signal being the sampled signal for the fourth sample circuit.

20. An average current measuring circuit in accordance with claim 19 further comprising:
a second one shot multivibrator having an input coupled to receive the control signal for pulse width modulating and producing an output signal having an astable state in response to an input signal of a first level, the output signal being coupled to a clock input of the second bistable circuit; and wherein
the control signal for pulse width modulating the second switch is coupled to a data input of the first bistable circuit.

21. An average current measuring circuit in accordance with claim 17 further comprising:
a second current limiter coupled to receive a reference circuit limit signal proportional to a maximum magnitude of current which is permitted to flow through the second switch and to receive the output signal from the second current transformer for producing a current limit control signal when the magnitude of current flow through the second switch exceeds the current limit signal which causes the second switch to turn off.

22. An average current measuring circuit in accordance with claim 17 further comprising:
a second current limiter coupled to receive a reference circuit limit signal proportional to a maximum magnitude of current which is permitted to flow through the second switch and to receive an output signal from the second sampling circuit for producing a current limit control signal when the magnitude of current flow through the second switch exceeds the current limit signal which causes the second switch to turn off.

23. An average current measuring circuit in accordance with claim 17 further comprising:
a controller for controlling the conductivity of the first and second switches to control producing of a variable fundamental frequency varying from zero to a predetermined frequency; and
means, responsive to the average signal produced by the averaging circuit and coupled to the first and second switches, for varying a time interval during which the first and second switches are turned on as a function of a difference between the average signal and a current reference signal.

24. An average current measuring circuit in accordance with claim 23 wherein:
the load is an electrical motor having a resolver which produces a signal representative of a position of a rotor of the motor; and
the means for varying comprises an integrator for integrating a signal proportional to the difference between the average signal and the current reference signal to produce an integrated output signal and a summer for summing the signal representative of the position of the rotor and the integrated output signal to produce a signal for controlling a time during which the first and second switches are turned on.

25. An inverter comprising:
first and second switches which are switched with a controlled duty cycle to produce a series of current pulses defining a fundamental frequency varying from zero up to a predetermined frequency;
first and second current transformers which respectively sense current flow in individual current pulses from the first and second switches to a load; and
an averaging circuit, coupled to the current transformers, for producing an average of current flow at a beginning and at an ending of each current pulse of current flow within the current pulses which is used for controlling the duty cycle.

26. An inverter in accordance with claim 25 wherein:
the inverter is coupled to an electrical motor for controlling acceleration of the electrical motor from a stop to a predetermined speed by varying the fundamental frequency from zero to the predetermined frequency.

27. An inverter in accordance with claim 25 further comprising:
a controller for controlling the first and second switches to control the producing of the variable fundamental frequency; and
means, responsive to the signal which is a function of the average current flow within the current pulses, for varying a time interval during which the first and second switches are turned on as a function of a difference between the signal which is a function, of the average current flow and a current reference signal.

28. An inverter in accordance with claim 27 further comprising:
a resolver, associated with a motor, which produces a signal representative of a position of a rotor of the motor; and wherein
the means for varying comprises an integrator for integrating a signal proportional to the difference between the signal which is a function of the average current and the current reference signal, to produce an integrated output signal, and a summer for summing the signal representative of the position of the rotor and the integrated output signal to produce a signal for controlling a time which the first and second switches ae turned on.

* * * * *